(12) United States Patent
Shao et al.

(10) Patent No.: US 7,389,356 B2
(45) Date of Patent: Jun. 17, 2008

(54) GENERALIZED DIFFERENTIATION METHODS AND ARRANGEMENTS FOR ADAPTIVE MULTIMEDIA COMMUNICATIONS

(75) Inventors: Huai-Rong Shao, Beijing (CN); Wenwu Zhu, Basking Ridge, NJ (US); Ya-Qin Zhang, West Windsor, NJ (US)

(73) Assignee: Microsoft Corporation, Redmond, WA (US)

( * ) Notice: Subject to any disclaimer, the term of this patent is extended or adjusted under 35 U.S.C. 154(b) by 810 days.

(21) Appl. No.: 09/862,410

(22) Filed: May 21, 2001

(65) Prior Publication Data

US 2001/0047423 A1    Nov. 29, 2001

Related U.S. Application Data

(63) Continuation-in-part of application No. 09/464,671, filed on Dec. 15, 1999.

(51) Int. Cl.
*G06F 15/16* (2006.01)
*G06F 15/173* (2006.01)
*G06T 15/00* (2006.01)
*H04N 7/15* (2006.01)

(52) U.S. Cl. ............... 709/235; 709/224; 709/219; 345/419; 348/15

(58) Field of Classification Search ........ 709/204, 709/207, 219, 231, 232, 235, 236, 224; 345/419; 348/15
See application file for complete search history.

(56) References Cited

U.S. PATENT DOCUMENTS

| | | | |
|---|---|---|---|
| 5,548,532 A | | 8/1996 | Menand et al. |
| 5,729,649 A | * | 3/1998 | Lane et al. ............... 386/68 |
| 5,894,321 A | * | 4/1999 | Downs et al. ........... 348/14.09 |
| 5,923,814 A | | 7/1999 | Boyce |
| 5,978,034 A | * | 11/1999 | Hosaka ................. 375/240.16 |
| 6,014,694 A | * | 1/2000 | Aharoni et al. ............ 709/219 |
| 6,057,884 A | * | 5/2000 | Chen et al. ............ 375/240.16 |
| 6,078,998 A | | 6/2000 | Kamel et al. |
| 6,092,107 A | | 7/2000 | Eleftheriadis et al. |
| 6,104,757 A | | 8/2000 | Rhee |
| 6,125,110 A | | 9/2000 | Proctor et al. |
| 6,147,980 A | | 11/2000 | Yee et al. |
| 6,175,569 B1 | | 1/2001 | Ellington, Jr. et al. |
| 6,185,602 B1 | | 2/2001 | Bayrakeri |
| 6,188,670 B1 | * | 2/2001 | Lackman et al. ........... 370/231 |
| 6,205,150 B1 | | 3/2001 | Ruszczyk |

(Continued)

OTHER PUBLICATIONS

Fukunaga, "MPEG-4 video Verification Model version 14.2", pp. 1-387, Dec. 1999.

(Continued)

*Primary Examiner*—Bunjob Jaroenchonwanit
*Assistant Examiner*—Philip C Lee
(74) *Attorney, Agent, or Firm*—Lee & Hayes, PLLC

(57) ABSTRACT

Various methods and arrangements are provided for transmitting adaptive multimedia content over networks that provide differential services. By way of example, one method includes compressing video objects, generating at least one corresponding elementary stream containing the compressed video objects, classifying information within each elementary stream based on importance, and assembling the classified information into packets associated with different classes of network packets. In classifying the information within each elementary stream based on importance, different priority levels can be assigned to shape, motion, and texture information. Methods and arrangements are also provided for use with multimedia content information that includes audio information, image information, textual information, and the like.

7 Claims, 7 Drawing Sheets

U.S. PATENT DOCUMENTS

| | | |
|---|---|---|
| 6,215,766 B1 * | 4/2001 | Ammar et al. ............... 370/229 |
| 6,266,817 B1 * | 7/2001 | Chaddha ..................... 725/146 |
| 6,307,885 B1 * | 10/2001 | Moon et al. ........... 375/240.08 |
| 6,320,845 B1 | 11/2001 | Davie |
| 6,329,986 B1 * | 12/2001 | Cheng ........................ 345/419 |
| 6,360,075 B1 | 3/2002 | Fischer et al. |
| 6,459,682 B1 | 10/2002 | Ellesson et al. |
| 6,483,874 B1 * | 11/2002 | Panusopone et al. .. 375/240.08 |
| 6,490,705 B1 * | 12/2002 | Boyce ........................ 714/776 |
| 6,499,060 B1 * | 12/2002 | Wang et al. ................. 709/231 |
| 6,512,793 B1 * | 1/2003 | Maeda .................. 375/240.08 |
| 6,526,062 B1 | 2/2003 | Milliken et al. |
| 6,546,017 B1 | 4/2003 | Khaunte |
| 6,549,938 B1 | 4/2003 | Kilkki et al. |
| 6,577,596 B1 | 6/2003 | Olsson et al. |
| 6,587,433 B1 * | 7/2003 | Borella et al. ............... 370/230 |
| 6,587,985 B1 | 7/2003 | Fukushima et al. |
| 6,606,413 B1 * | 8/2003 | Zeineh ....................... 382/232 |
| 6,611,875 B1 | 8/2003 | Chopra et al. |
| 6,633,564 B1 | 10/2003 | Steer et al. |
| 6,643,258 B1 * | 11/2003 | Ise et al. .................... 370/230 |
| 6,651,101 B1 * | 11/2003 | Gai et al. ................... 709/224 |
| 6,661,774 B1 | 12/2003 | Lauffenburger et al. |
| 6,782,132 B1 * | 8/2004 | Fogg .......................... 382/232 |
| 6,788,740 B1 * | 9/2004 | van der Schaar et al. .. 375/240 |
| 6,859,496 B1 * | 2/2005 | Boroczky et al. ...... 375/240.26 |

OTHER PUBLICATIONS

McCanne, "Receiver-driven Layered Multicast", pp. 1-14; Aug. 1996.

Wu, et al., "On End-to-End Architecture for Transporting MPEG-4 video Over the Internet", v10 No. 6 pp. 923-941, Sep. 2000.

* cited by examiner

700

| Object ID | Priority Class | IL | NVP |
|---|---|---|---|
| Length$_0$ (bytes) ||||
| ... ||||
| Length$_{NVP-1}$ (bytes) ||||
| Compressed Data (byte aligned) |||| where:
IL = 1, interleaved, or 0 otherwise
NVP = Number of video packets in the ALP
Length = Length of each compressed data (full or part information of a video packet)

GENERALIZED DIFFERENTIATION METHODS AND ARRANGEMENTS FOR ADAPTIVE MULTIMEDIA COMMUNICATIONS

RELATED PATENT APPLICATIONS

This patent is a continuation-in-part (CIP) to a co-pending U.S. patent application, for inventors Huai-Rong Shao and Ya-Qin Zhang, entitled "User And Content Aware Object-based Data Stream Transmission Methods And Arrangements", Ser. No. 09/464,671, filed on Dec. 15, 1999. Priority to this parent/co-pending patent application is hereby claimed. This parent/co-pending patent application is also, hereby, incorporated by reference, and for all purposes.

TECHNICAL FIELD

The present invention relates generally to data communications, and more particularly to improved methods and arrangements that employ novel differentiation techniques for adaptive multimedia unicast and multicast communications.

BACKGROUND

Just as the speed of computers and networks have increased dramatically over the past few years, so too have the number and variety of networked multimedia applications proliferated rapidly. Unfortunately, conventional Internet Protocol (IP) networks usually only offer a so-called best effort (BE) service to communicating devices. This BE service does not make any service quality commitments. However, most multimedia applications are delay/loss sensitive. As such, these multimedia applications/devices would benefit from what is commonly known as Quality of Service (QoS) support/guarantees from the interconnecting network(s).

Consequently, the current Internet is becoming increasingly inadequate to support the service demand from such multimedia applications/devices, such as, for example, multimedia streaming applications/devices.

To support QoS in the Internet, the governing Internet Engineering Task Force (IETF), which is the main standards organization for the Internet, has defined two architectures that are expected to be implemented in the future, namely an Integrated Services or Intserv, and a Differentiated Services or DiffServ.

The integrated services model basically provides per-flow QoS guarantees. Here, a Resource Reservation Protocol (RSVP) was suggested for resource admission control and resource allocation. However, it is very complicated for conventional backbone routers in the network(s) to maintain the current states of thousands or more communication flows (e.g., streaming media packets).

On the other hand, the differentiated services model gives a class-based solution to support a relative QoS. Essentially, in differentiated services, packets can be divided into different QoS classes and forwarded at different priorities. The QoS class of each packet is specified in IPv4 by the Type of Service (TOS) byte or in IPv6 by a Traffic Class (TC) byte. Being highly scalable and relatively simple, the differentiated services model may come to dominate the backbone of the next generation(s) of the Internet.

Scalable coding (e.g., temporary, special and/or quality scalability) for different kinds of media has become one of the more important trends as of recent in the multimedia compression area, both in industry and academia. Many scalable coding methods have been suggested, such as, for example, layered coding, fine granularity scalability, embedded coding, and wavelet coding, to name a few. Scalable coding methods are very useful for multimedia transmission due to the network bandwidth fluctuation.

As the technology of the Internet and other like networks continues to grow there is a need for improved methods and arrangements that can effectively take advantage of the planned services and/or other coding schemes to provide an improved multimedia communication environment.

SUMMARY

The present invention provides improved methods and arrangements that take full advantage of these new and/or other like future services, suitable for the Internet and other like networks, to provide an improved multimedia communication environment.

In accordance with certain aspects of the present invention, the improved methods and arrangements implement differentiation techniques for adaptive multimedia unicast and multicast communications over heterogeneous user- and network-environments.

These methods and arrangements can, for example, provide differentiation functionality within one network session as well as among different network sessions. For example, using differentiation capabilities within one network session, it is possible to implement an adaptive transmission environment for multimedia communications using scalable coding technology.

Further, in accordance with certain other aspects of the present invention, improved methods and arrangements implement application-aware intelligent resource controls, for example, at or near the edge of a network to coordinate limited resources among competing users and applications. In accord with the concept of application-awareness, a network will thus be able to implement resource management and control in a more efficient and intelligent manner.

In accordance with certain aspects of the present invention, the improved methods and arrangements include the use of a multimedia processing agent (MPA) at potential bottleneck regions in a network to implement packet-level fast transcoding and related signaling.

In accordance with still other aspects of the present invention, a dynamic class mapping policy and associated bit rate control and adaptation mechanism are provided, which selectively drop packets to minimize end-to-end quality distortions.

In accordance with additional aspects of present invention, scalable compressed multimedia communication techniques are provided, which take advantage of differentiated services within a heterogeneous network and user environment.

In accordance with certain further aspects of the present invention, techniques are introduced that implement rate controls without having to reassemble packets and repacketize the bitstream.

BRIEF DESCRIPTION OF THE DRAWINGS

A more complete understanding of the various methods and arrangements of the present invention may be had by reference to the following detailed description when taken in conjunction with the accompanying drawings wherein.

DETAILED DESCRIPTION

Figure 1:
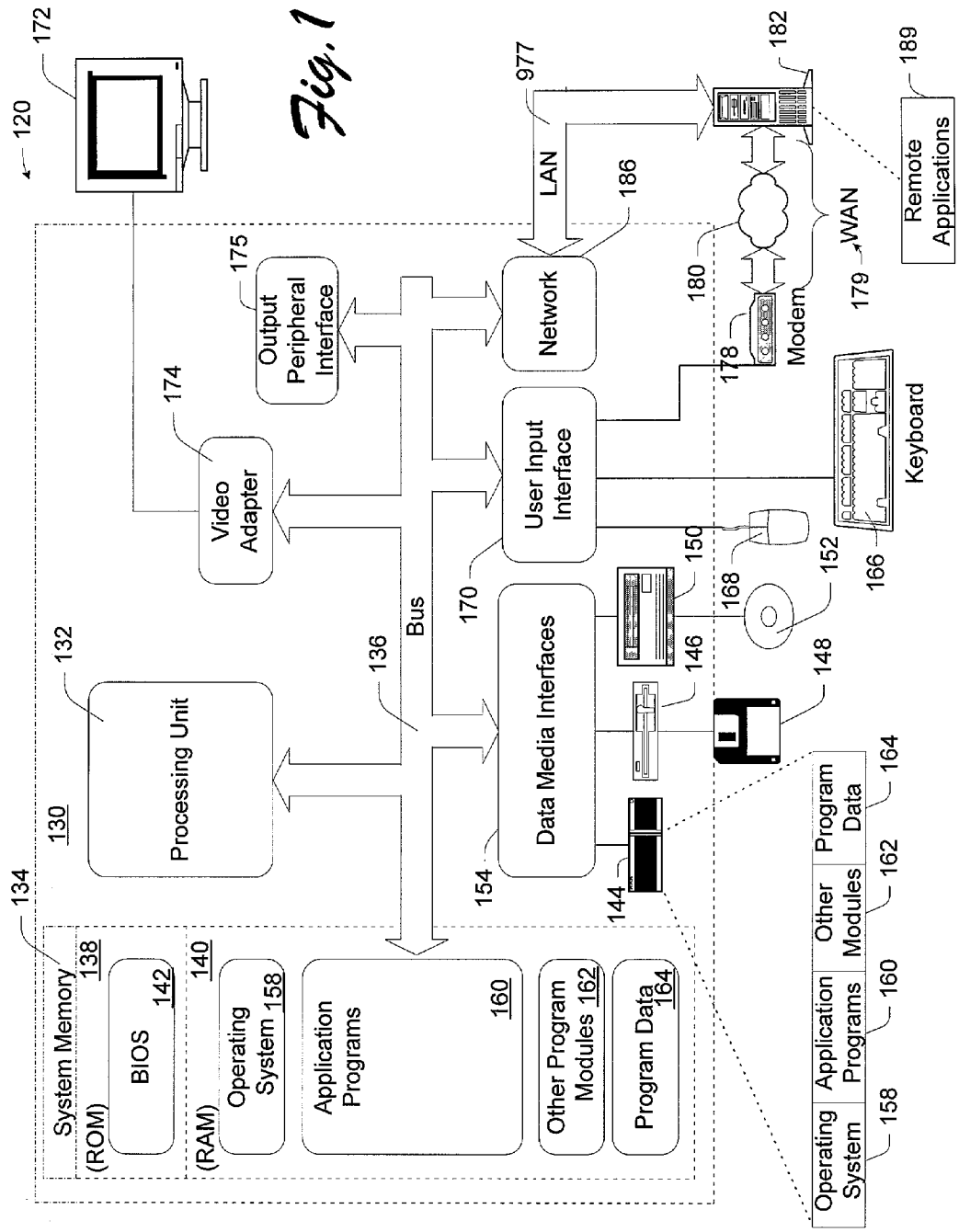
FIG. 1 is a block diagram that depicts an exemplary device, in the form of a computer, which is suitable for use with certain implementations of the present invention.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing environment 120 on which the subsequently described methods and arrangements may be implemented.

Exemplary computing environment 120 is only one example of a suitable computing environment and is not intended to suggest any limitation as to the scope of use or functionality of the improved methods and arrangements described herein. Neither should computing environment 120 be interpreted as having any dependency or requirement relating to any one or combination of components illustrated in computing environment 120.

The improved methods and arrangements herein are operational with numerous other general purpose or special purpose computing system environments or configurations. Examples of well known computing systems, environments, and/or configurations that may be suitable include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 1, computing environment 120 includes a general-purpose computing device in the form of a computer 130. The components of computer 130 may include one or more processors or processing units 132, a system memory 134, and a bus 136 that couples various system components including system memory 134 to processor 132.

Bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 130 typically includes a variety of computer readable media. Such media may be any available media that is accessible by computer 130, and it includes both volatile and non-volatile media, removable and non-removable media.

In FIG. 1, system memory 134 includes computer readable media in the form of volatile memory, such as random access memory (RAM) 140, and/or non-volatile memory, such as read only memory (ROM) 138. A basic input/output system (BIOS) 142, containing the basic routines that help to transfer information between elements within computer 130, such as during start-up, is stored in ROM 138. RAM 140 typically contains data and/or program modules that are immediately accessible to and/or presently being operated on by processor 132.

Computer 130 may further include other removable/non-removable, volatile/non-volatile computer storage media. For example, FIG. 1 illustrates a hard disk drive 144 for reading from and writing to a non-removable, non-volatile magnetic media (not shown and typically called a "hard drive"), a magnetic disk drive 146 for reading from and writing to a removable, non-volatile magnetic disk 148 (e.g., a "floppy disk"), and an optical disk drive 150 for reading from or writing to a removable, non-volatile optical disk 152 such as a CD-ROM, CD-R, CD-RW, DVD-ROM, DVD-RAM or other optical media. Hard disk drive 144, magnetic disk drive 146 and optical disk drive 150 are each connected to bus 136 by one or more interfaces 154.

The drives and associated computer-readable media provide nonvolatile storage of computer readable instructions, data structures, program modules, and other data for computer 130. Although the exemplary environment described herein employs a hard disk, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 148, optical disk 152, ROM 138, or RAM 140, including, e.g., an operating system 158, one or more application programs 160, other program modules 162, and program data 164.

The improved methods and arrangements described herein may be implemented within operating system 158, one or more application programs 160, other program modules 162, and/or program data 164.

A user may provide commands and information into computer 130 through input devices such as keyboard 166 and pointing device 168 (such as a "mouse"). Other input devices (not shown) may include a microphone, joystick, game pad, satellite dish, serial port, scanner, camera, etc. These and other input devices are connected to the processing unit 132 through a user input interface 170 that is coupled to bus 136, but may be connected by other interface and bus structures, such as a parallel port, game port, or a universal serial bus (USB).

A monitor 172 or other type of display device is also connected to bus 136 via an interface, such as a video adapter 174. In addition to monitor 172, personal computers typically include other peripheral output devices (not shown), such as speakers and printers, which may be connected through output peripheral interface 175.

Computer 130 may operate in a networked environment using logical connections to one or more remote computers, such as a remote computer 182. Remote computer 182 may include many or all of the elements and features described herein relative to computer 130.

Logical connections shown in FIG. 1 are a local area network (LAN) 177 and a general wide area network (WAN) 179. Such networking environments are commonplace in offices, enterprise-wide computer networks, intranets, and the Internet.

When used in a LAN networking environment, computer 130 is connected to LAN 177 via network interface or adapter 186. When used in a WAN networking environment, the computer typically includes a modem 178 or other means for establishing communications over WAN 179. Modem 178, which may be internal or external, may be connected to system bus 136 via the user input interface 170 or other appropriate mechanism.

Depicted in FIG. 1, is a specific implementation of a WAN via the Internet. Here, computer 130 employs modem 178 to establish communications with at least one remote computer 182 via the Internet 180.

In a networked environment, program modules depicted relative to computer 130, or portions thereof, may be stored in a remote memory storage device. Thus, e.g., as depicted in FIG. 1, remote application programs 189 may reside on a memory device of remote computer 182. It will be appreciated that the network connections shown and described are exemplary and other means of establishing a communications link between the computers may be used.

The following numbered sections focus on certain exemplary implementations of the present invention, which are more directly associated with data communications using the above computer and/or other like devices/appliances.

Figure 2:
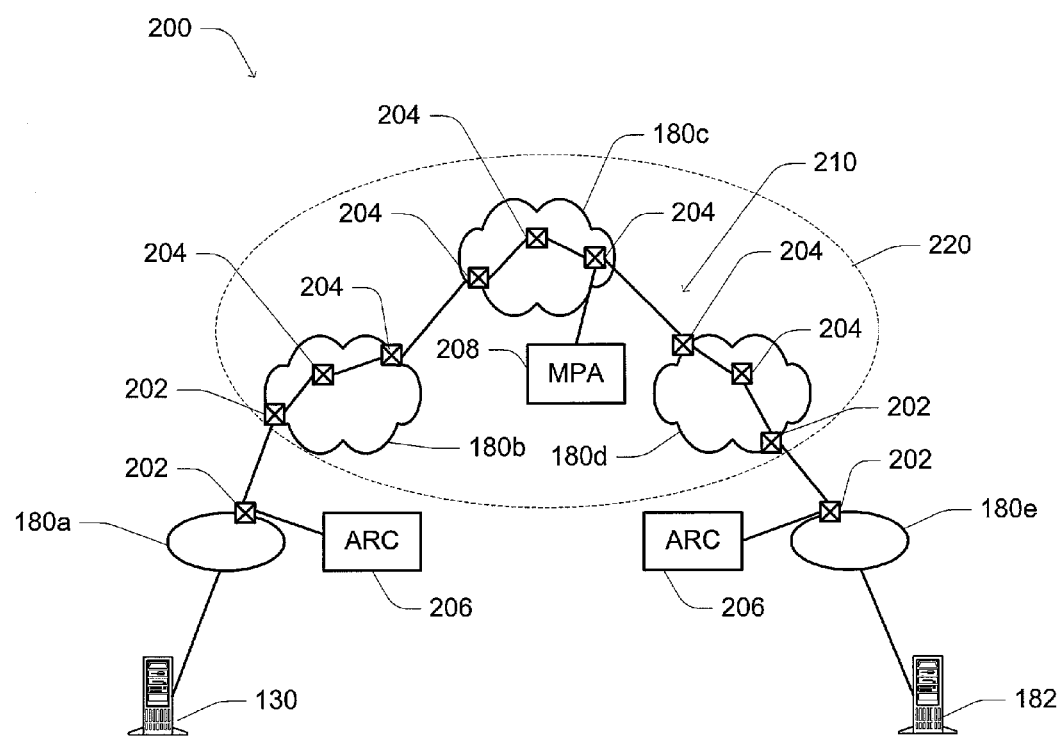
FIG. 2 is a block diagram that depicts a general framework architecture for adaptive multimedia applications/devices, in accordance with certain exemplary implementations of the present invention.

1. Framework of User-Aware Object-Based Video Transmission Over a Differentiated Services Network FIG. 2 depicts an exemplary improved general transport framework architecture 200 that is suitable for use by complex multimedia applications, such as, e.g., those providing content using MPEG-4 and the like having multiple objects and being capable of utilizing differentiated services.

In this example, framework architecture 200 includes two host devices, namely computer 130 and remote computer 182, which are interconnected via a plurality of networks 180a-e. Here, networks 180a and 180e are access networks, and networks 180b-d are domain-based networks, which are part of a backbone network 220. Edge routers 202 are operatively provided at or near the edge (e.g., input and/or output) of networks 180a-e. Additionally, a core router/switch 204 is depicted within networks 180b-d as connecting the edge routers 202 therein. Edge routers 202 depicted in networks 180a and 180e are each further operatively coupled to a different application-aware resource controller (ARC) 206. The underlying functionality of an ARC 206 may be provided within the edge routers 202 of networks 180a and 180e, or may be provided, as shown in this example, via one or more separate devices, as represented by the drawn box. One or more media processing agents (MPAs) are provided where a potential bottleneck may occur, such as, e.g., region 210. Thus, as depicted, an MPA 208 is operatively coupled to an edge router 202 in network 180c.

In this example, framework architecture 200 combines differentiated services (DiffServ) and Integrated services (IntServ). Thus, for example, per-conversion admission control using RSVP (Resource Reservation Protocol) is supported at the edge of the networks but aggregate traffic handling is implemented within the backbone. In architecture 200, although signaling messages traverse the networks end-to-end, they are processed only in the hosts and in the router that is appointed as admission control agent for a routed network.

The core router/switch 204 in each of the routed networks 180b-d apply aggregate traffic handling and do not process signaling messages. This model of per-conversation signaling at the edge of the network (e.g., at edge routers 202) and aggregate traffic handling in the core (e.g., core routers/switches 204), yields a reasonable tradeoff between complexity and efficiency.

MPA 208, which may be a component in a router or gateway or a server attached to a router, for example, is responsible for adapting the stream rate to the network's state.

ARC 206 has the responsibility of handling application-based signaling according to an application-aware resource control policy, rather than per-flow signaling. Therefore, the traffic overload of signaling is significantly reduced in framework 200.

1.1 Differentiation Functionality within One Network Session

Previous works on multimedia communications have typically only considered how to differentiate media streams, i.e., different packets in one network session have the same communication characteristics. Accordingly, information with different transmission requirements needs to be transported by different network sessions. For example, in layered coding and transmission, multiple independent communication channels are required for different layers.

At least two problems arise due to these proposed multiple channel approaches. The first problem is related to the synchronization between channels and the network state maintenance. More particularly, for complex multimedia applications such as MPEG-4 programs, there are commonly multiple objects of the same media or different media. When these objects have different QoS requirements, each object is served by an individual network session or even several sessions in the case of multiple layers. This makes it increasingly complicated for the end-system and interconnecting networks to maintain so many sessions for one application. However, if differential marking within a flow is supported, then the layers that belong to the same object or different objects can be multiplexed into one network session. While one may argue that marking packets differently within a session can cause packet miss-ordering problems, it is noted that the multiple session approaches lead to the same potential problems. Moreover, in fact, whether differentiation within one flow can bring miss-ordering problems is decided by the mechanism of buffer and queuing management. If differentiation within a flow is implemented using one queue, the packets within one flow should maintain the correct order upon arriving at the destination. To support the new differentiation functionality, a minimal extension needs to be made on the protocol stack of the end-system for hosts 130, 182 and/or ARC 208.

Figure 3:
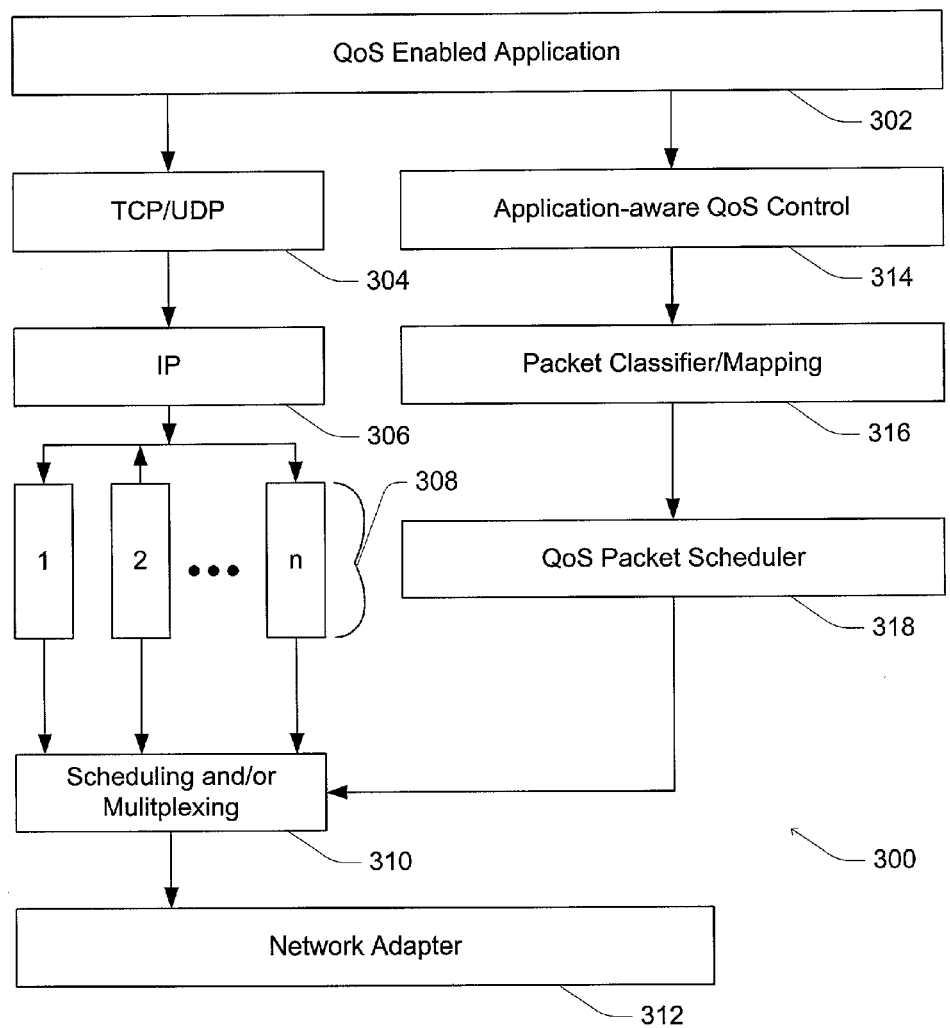
FIG. 3 is a block diagram that depicts an architecture of a protocol stack to support differentiation services within one flow, in accordance with certain exemplary implementations of the present invention.

FIG. 3 shows the diagram of an exemplary extended IP stack 300, in accordance with certain implementations of the present invention. Extended IP stack 300 is provided between a QoS enabled application 302 and a network adapter 312 (e.g., adapter 186 in FIG. 1). Extended IP stack 300 includes, in order in the data path beginning from the output of QoS enabled application 302, a TCP/UDP layer 304, an IP layer 306, and a queuing layer 308 having plurality of priority class queues (e.g., 1, 2, . . . , n). As shown, extended IP stack 300 further includes, in order in a control path beginning from the output of QoS enabled application 302, an application-aware QoS control layer 314, a packet classifier/mapping layer 316, and a QoS packet scheduler layer 318. Both the data path and control path feed into a scheduling and/or multiplexing layer 310, prior to network adapter 312.

By default, packets are marked based on a mapping from the service type associated with a flow. Traditionally, all packets within one flow would have the same marking value.

Breaking with tradition, the methods and arrangements provided herein present a new marker mapping mechanism in the host protocol stack to support differentiation within one flow. A multiple queue mechanism is introduced at the end-system, wherein each queue is configured to buffer packets with a particular priority class. Thus, for example, when an IP header is added at IP layer 306, the priority is mapped to the DSCP (DiffServ Code Point) byte therein.

1.2 Application-Aware Intelligent Resource Control and Management

ARC 206 is, in its most basic sense, a logical entity. As such, for example, ARC 206 can be implemented as a functional part of a proxy server or an edge router 202, or an independent sever between an access network 180*a,e* and the backbone network (e.g., networks 180*b-d* combined).

Traditional admission control mechanisms do not usually consider the semantic relationship among different flows within one application. On the contrary, ARC 206 uses control messages to interact with the server and receivers, and dynamically allocate resources to different applications and different flows according to network state and/or user preferences. Hence, when faced with limited network bandwidth, ARC 206 can allocate more of the available bandwidth to an object requiring better perceptual visual quality by a receiver than other objects, for example, as selected by the user in mouse clicking, etc. on the object.

In accordance with certain exemplary implementations of the present invention, ARC 206 can be configured to provide all or part of the following capabilities:

Receiving application admission request from sending users.

Interacting with remote ARCs on the access networks of the receivers or MPAs on the forwarding path to exchange signaling messages.

Providing feedback to senders as to whether to admit the application.

Aggregating traffic from local users and dynamically mapping traffic to DiffServ classes or the like.

Coordinating bandwidth allocation among multiple applications and video object flows Dynamically mapping different priorities information to different network classes.

With this in mind, an exemplary ARC 206 uses an adaptive transmission scheme as described in numbered section 3 below to adapt the flow rate to a network state and/or user requirements.

Signaling messages (e.g., RSVP messages) traverse the network from end to end, they are processed only in the hosts (130, 182), in MPA 208 and in ARCs 206 for the routed network. Core routers/switches 204 within routed networks apply aggregate traffic handling and do not process signaling messages. In framework architecture 200, ARCs 206 are responsible for the application based signaling according to the application-aware resource control, not per-flow signaling. Thus, the traffic overload of signaling is significantly reduced.

1.3 Multimedia Processing Agent (MPA)

MPA 208 is configured to take advantage of a scalable transmission scheme, for example, as described in subsequent sections, to adapt the stream rate to network state and user requirements. MPA 208 can, for example, be a component in a router, gateway, a server attached to a router, etc. This solution allows MPA 208 to be advantageously/strategically placed on the node(s) that connect to known or potential network bottlenecks. There can be multiple MPAs along the path from a server host to a client host. By introducing the concept of a multimedia processing agent between a server host and heterogeneous client hosts, this scheme can adapt the bandwidth of each client host to its capacity. Therefore, each user can obtain the maximum bandwidth rather than the minimum one as in a traditional multicast.

In accordance with certain exemplary implementations of the present invention, MPA 208 can be configured to provide all or part of the following capabilities:

Receiving video object streams from the server host and/or a previous MPA.

Filtering received video object streams by selectively discarding packets with lower priorities, as needed.

Sending filtered video object streams to clients or a next MPA.

Receiving requests from clients or a next MPA.

Acting upon requests and/or generating a combined request from multiple clients or next MPA(s) and forwarding the combined request to previous MPA(s).

Coordinating bandwidth allocation among multiple video object streams.

Performing application-aware admission control.

Performing dynamic bandwidth re-allocation according to the semantic information of a video object, such as, for example, a scene change.

1.4 Network-Aware End System

Figure 4:
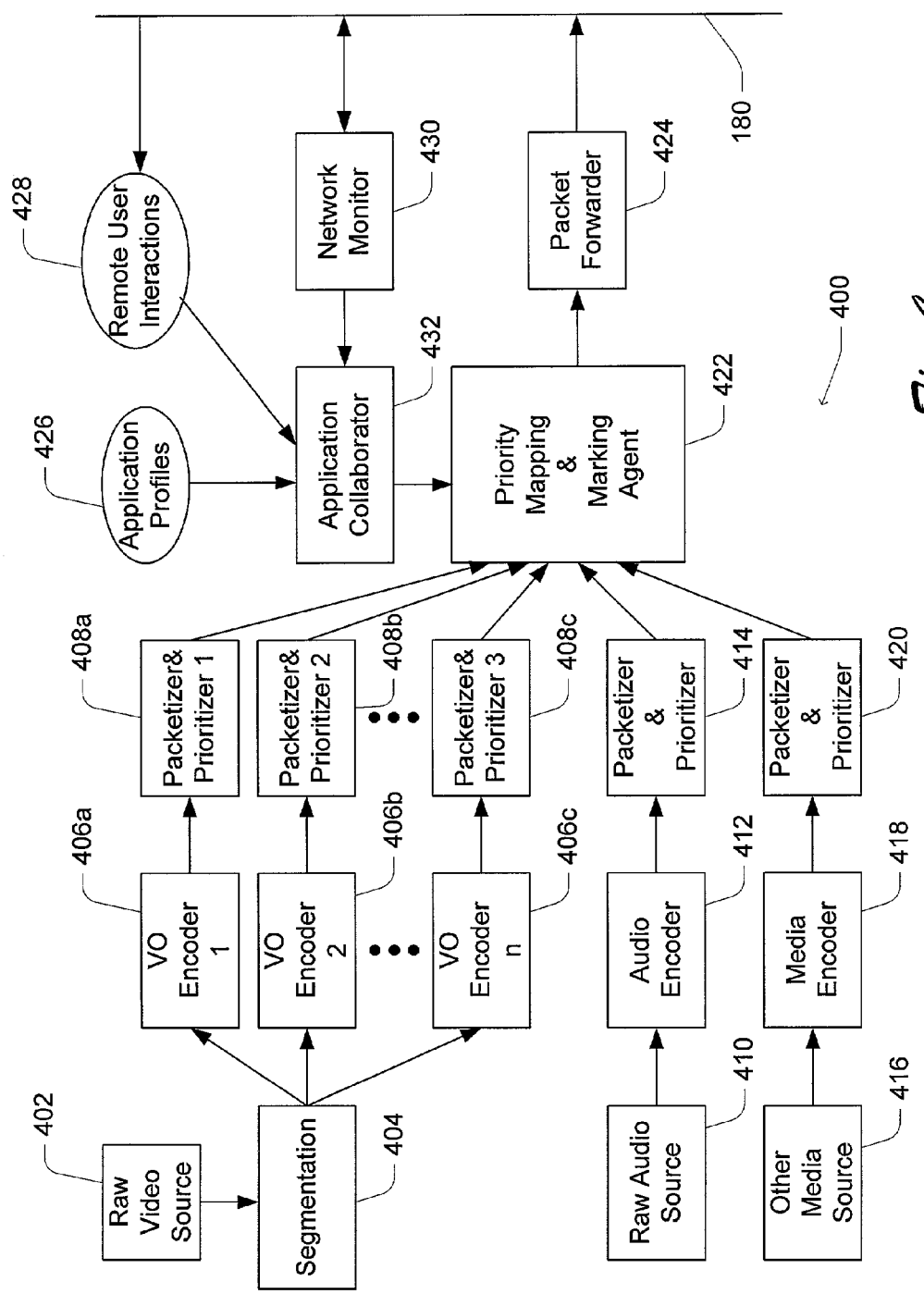
FIG. 4 is a block diagram that depicts an end-system architecture, in accordance with certain exemplary implementations of the present invention.

FIG. 4 shows an end-system architecture 400 at a streaming server host with intelligent resource control and management for multimedia applications, in accordance with certain exemplary implementations of the present invention.

As depicted, in this example end-system architecture 400 includes a video source 400 that is configured to provide a raw or like video data to a segmentor 404. Segmentor 404 outputs video object(s) (VOs) as segmented from the received video data to one or more VO encoders (1, 2, . . . , n) 406a-c. VO encoders 406a-c encode the VO and provide encoded VO data to corresponding packetizers/ prioritizers (1, 2, . . . , n) 408a-c. Packetizers/prioritizers 408a-c output packetized VO data to a priority mapping/ marking agent 422.

Exemplary end-system architecture 400 also includes an audio source 410 that is configured to provide a raw or like audio data (presumably related to the video data) to an audio encoder 412 that is configured to encode the audio data and provide encoded audio data to a packetizer/prioritizer 414. Packetizer/prioritizer 414 is configured to output packetized audio data to priority mapping/marking agent 422.

Similarly, end-system architecture 400, in this example, also includes an media source 416 that is configured to provide other non-video/audio data to a media encoder 418, which is configured to encode the media data and provide encoded audio data to a packetizer/prioritizer 420. Packetizer/prioritizer 420 is configured to output packetized media data to priority mapping/marking agent 422.

As shown, priority mapping/marking agent 422 is configured to provide priority mapped/marked data packets to a packet forwarder 424 that is coupled to network 180. Priority mapping/marking agent 422 is further configured to receive inputs (e.g., commands, feedback, etc.) from an application collaborator 432.

Application collaborator 432 is configured to accept inputs from one or more application profiles 426, remote user interactions 428, and/or network monitor 430. As depicted, the remote user interactions 428 are provided via network 180. Network monitor 430 is also coupled to network 180.

With this overview in mind, exemplary end-system architecture 400 considers the transmission of multiple-object video programs and other types of media such as audio and data. Each VO is compressed first and the corresponding elementary stream is generated. Then information within each elementary stream is classified based on importance and assembled into packets with different DifiServ classes.

Network monitor 430 is responsible for estimating the available network bandwidth dynamically through probing or feedback-based approach. Packet forwarder 424 forwards the packets to the network. The remaining other functional components are described as follows.

Priority Mapping and Marking Agent 422

This component is responsible for the interaction between applications and the DiffServ networks. It assigns DSCP marks to packets and maps them to the corresponding DiffServ classes.

Application Collaborator 432

Application Collaborator 432 is responsible for resource coordination among multiple objects within one application and among multiple applications. It receives information from application profile(s) 426, remote users interactions 428, and network monitor 430 to make such decisions. In addition, the application collaborator 432 identifies how to map packet priorities from individual encoders into network classes. Here, for example, a receiver host(s) can interact with the server through user-level signaling.

Application Profile(s) 426

This component records the semantic information of the application(s) such as which media and flow(s) are included in an application and their relative importance levels.

Remote User Interactions 428

A user can interact with the video player or the server in several ways such as mouse clicking, mouse moving, fast forward, fast backward, object zoom-in, object zoom-out, add or delete. Many of these interactivity behaviors require dynamic adaptation of the bit rate of each video object and dynamic resource allocation coordination among multiple video objects. In object-based video multicast applications, for example, it is noted that different client hosts can have different views and interactions for the same video.

1.5 Application-Flow-Layer Identifiers

Figure 5:
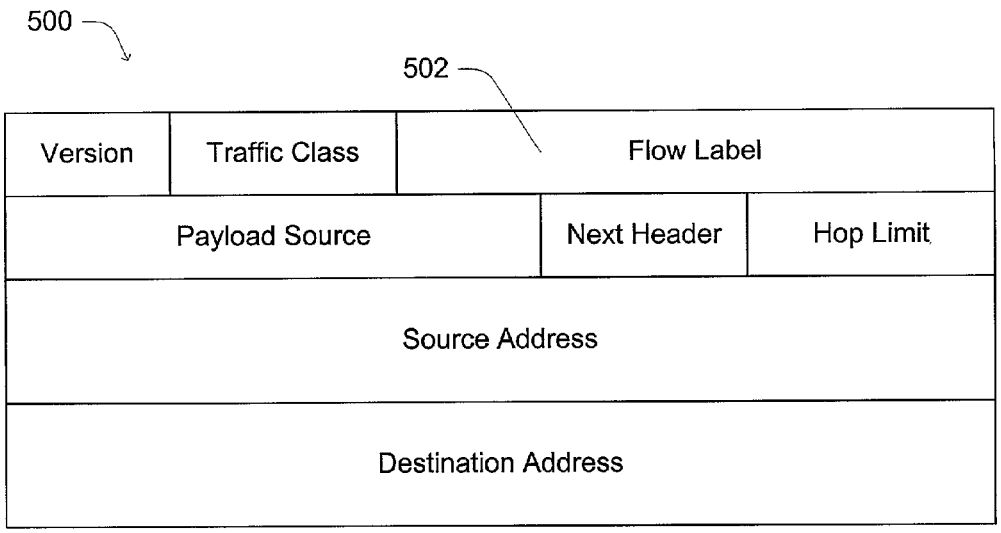
FIG. 5 is an illustrative representation of an IP header format, in accordance with certain exemplary implementations of the present invention.

An application-flow-layer identifier is used in a packet to identify the information within the packet. This Application-Flow-Layer Identifier can be used by ARCs and MPAs. FIG. 5 illustrates an exemplary header 500. Here, an IPv6 header is provided as an example to explain how to define such an identifier. Of particular interest in this example, is the (20-bit) flow label field 502. Flow label field 502 has not been defined by IETF and as such is used herein as an Application-Flow-Layer Identifier.

Figure 6:
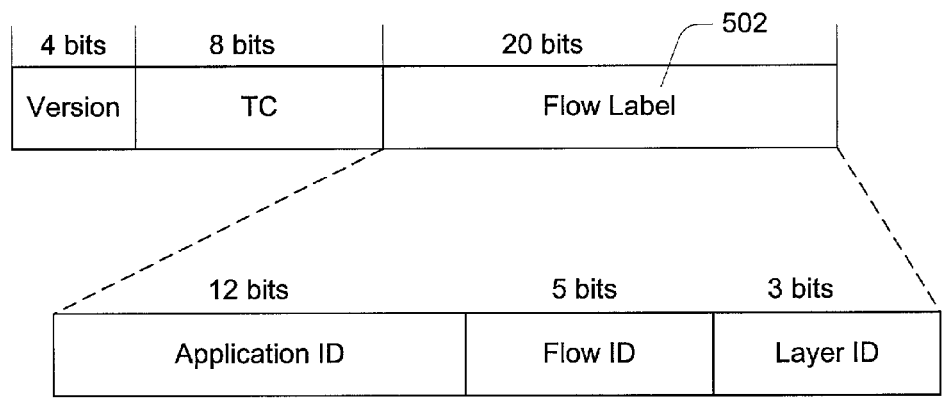
FIG. 6 is an illustrative representation of a flow label portion of the IP header format in FIG. 5, in accordance with certain exemplary implementations of the present invention.

FIG. 6 further illustrates one potential specification of the application-flow-layer identifier within the flow label field 502. Here, the 20-bit flow label field is specified as further including a 12-bit application identifier, a 5-bit flow identifier and a 3-bit layer identifier.

2. Bitstream Prioritization and Packetization

Different types of information within a compressed bitstream can have different importance levels for a receiving decoder (not shown), for example, in re-constructing a received video sequence. For example, a classical MPEG bitstream consists of a sequence of so-called I-, P-, and B-frames. I-frames are the most important frames, then come the P-frames. The B-frames tend to be the least important frames. These three types of frames can be mapped into different DiffServ classes.

Over the recent years, several kinds of scalable coding schemes have been developed to adapt multimedia bitstream to various network bandwidth requirements of heterogeneous networks and users. For example, layered coding is now very popular for video and audio streaming. The encoder can output one base layer and several enhancement layers. The information of the base layer is much more important than that of the enhancement layers. Obviously the base layer has the highest transmission priority. Fine granularity scalability (FGS) is a further extension of layered coding and can adjust transmission rate in smaller granularity.

In this section, a method is provided, which illustrates one to take advantage of DiffServ (within and among flows) for multimedia communications. Those skilled in the art will recognize that other scalable coding methods may be likewise adapted using similar approaches. Reference is also made to similar approaches described in U.S. patent application Ser. No. 09/464,671, supra.

Using one method, for example, information is separated within a video object bitstream according to type and importance levels and placed into different DiffServ class packets to achieve optimal playback quality under the resource and cost constraints.

Additionally, a new bitstream classification, prioritization, and packetization scheme is provided herein in which different types of data such as shape, motion, and texture are re-assembled, assigned to different priority classes, and packetized into different classes of network packets provided by differentiated services. In this manner, the packetization scheme can improve the error resilience and flexible bit rate control ability.

2.1 Bitstream Classification, Prioritization and Packetization

When network resources cannot satisfy the rate requirement of the video object flow, those packets with lower priorities will be discarded by the sender and/or intermediate nodes earlier than those with higher priorities. In addition, different error control mechanisms can be implemented on different priority packets to enhance the error resilience capability. To maintain compliance with the MPEG-4 syntax, for example, an index table can be used for each video object rather than define a new syntax in the video object bitstream. An index table can include several items, such as, e.g., an index number, information category, priority level, starting position (relative), and length. This table is used to index different types of information in the compressed bitstream. The data partitioning mode of video encoding can also be adapted in such an approach with an index table being generated along with a compressed bitstream after encoding a video object. Thusly, the index table is essentially a virtual table that acts only as a reference for extracting different parts of the information and does not constitute part of the bitstream.

Figures 7, 8:
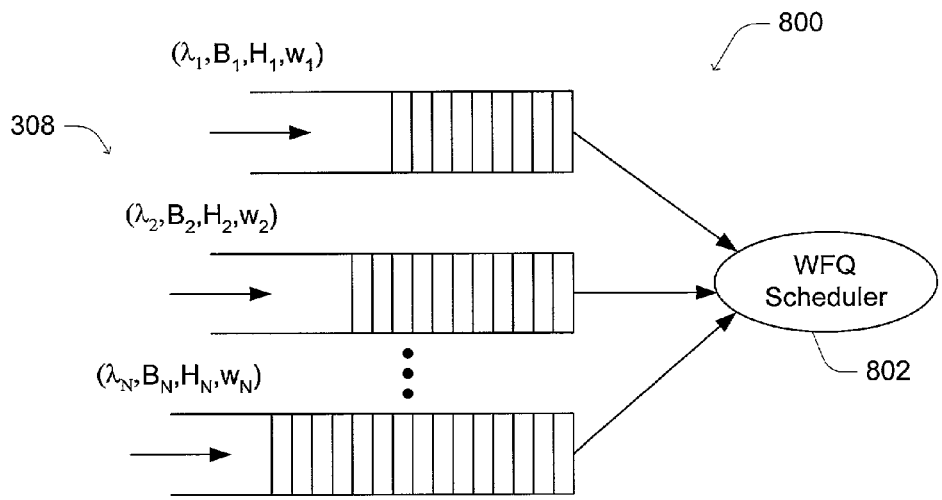
FIG. 7 is an illustrative representation of a format for an application level packet, in accordance with certain exemplary implementations of the present invention.
FIG. 8 is a block diagram of an analytical model for packet forwarding, in accordance with certain exemplary implementations of the present invention.

A new application level packet format 700 is defined and illustratively represented in FIG. 7 for object-based video. Here, for example, the video packet (VP) size can be limited to no more than the MTU (Maximum Transmission Unit) of the physical network. Preferably one should avoid using small VPs to achieve the packetization efficiency. As described in greater detail in the parent/co-pending patent application, several parts of the information with the same priority will be multiplexed at the VP level. It can been seen that some information of the index table is embedded within the VPs, and the receivers need not obtain the index table. When VPs arrive at the receivers, the compressed information is inserted into the proper position of the decoding buffer to be decoded.

2.2 Multiplexing

In this case, to minimize redundancy information, several parts of the information with the same priority can be multiplexed into one application level packet (ALP). However, if one packet that contains a lot of consecutive motion information is lost, significant quality degradation will be experienced in the quality of the subsequent video playback.

Two exemplary methods are provided herein that can reduce this kind of impairment. The first method is to limit the number of video packets in a ALP.

In the second exemplary method the content of video packets is arranged in an interleaving fashion. For example, the shape and motion information of video packets 0, 2, 4 may be placed into ALP0, and the information of video packet 1,3,5 may be placed into ALP1.

By way of further example, the shape and motion information and texture information of VPs may be added to an ALP and interleaved until one of the following constraints is met: the number of VPs in current NP reaches a certain threshold, the size of one VP reaches a certain maximum size, or a different vop_coding_type is found.

The following algorithm describes the multiplexing algorithm for P-VOP video packets. Basically, $VP_{SM}$ and $VP_{TXT}$ are added to ALP interleavily until one of the following constraints is met: number of VPs in current ALP reaches a certain threshold (VP_THRESHOLD), the size of one ALP reaches a certain maximum size (MAX_SIZE), or a different kind of VOP type is found.

```
//s is the index of the current video packet for this packetization process
//t is the index of the current ALP for this packetization process
k=0;
While (k<VP_THRESHOLD and
    VP_{s+k} vop_coding_type == "P" and
    VP_{s+k+1} vop_coding.type == "P" and
    Size(ALP_t) + Size(VP_{SM,s}) < MAX_SIZE and
    Size(ALP_{t+1}) + Size(VP_{SM,s+1}) < MAX_SIZE and
    Size(ALP_{t+2}) + Size(VP_{TXT,s}) < MAX_SIZE and
    Size(ALP_{t+3}) + Size(VPT_{TXT,s+1}) < MAX_SIZE
    )
{
    Append(ALP_t, VP_{SM,s});
    Append(ALP_{t+1}, VP_{SM,s+1});
    Append(ALP_{t+2}, VP_{TXT,s});
    Append(ALP_{t+3}, VPT_{TXT,s+1});
    k+= 2;
    s+=2;
};
if( Size(ALP_{t+2}) + Size(ALP_{t+3}) < MAX_SIZE)
{
Concatenate (ALP_{t+2}, ALP_{t+3});
t+=3;
)
else t += 4;
```

3. Adaptive Multimedia Transmission

After packetization, multimedia packets are sent to the network. Because the aggregated traffic overload of the network fluctuates with time, the video application is configured to adapt its transmission rate to the available network bandwidth accordingly, for example, to achieve fairness among different users. Various known methods can be adapted to calculate the available network bandwidth used by a video application. The sender can adjust the transmission rate to better match the estimated network bandwidth, for example, using rate controls at the encoder, and/or selectively dropping low priority packets. The packets selected to enter the network are mapped to various different DiffServ classes according to priority and the network resource state. The network can also drop packets to avoid or alleviate further network congestion.

3.1 Dynamic Rate Control

The methods and arrangements provided herein can support adaptive rate control by discarding some packets with lower priorities at the sender. The network can also drop different classes packets with different packet loss rate to adjust the bitrate. It is assumed, in this section, that there are N priority levels Pi ($0 \leq i < N$) for a multimedia object and M DiffServ classes Kj ($0 \leq j < M$) for the DiffServ network.

Let it also be assumed that: $e_i$ is the average weighting factor to affect the video quality of the $i^{th}$ priority when a portion of packets are lost; $c_j$ is the unit price of $j^{th}$ network class (\$/kb); $L_j$ is the packet loss rate of $j^{th}$ network class; $r_{ij}$ is the bit rate of the $i^{th}$ priority level to the $j^{th}$ network class. Given a cost budget C and available bandwidth for each network class $R_j$, the maximum end-to-end video quality (i.e., PSNR or the visual effect) can be obtained by minimizing the quality degradation D $$\min D = \min \sum_i e_i \sum_j L_j r_{ij} \qquad (1)$$

$$\text{subject to} \sum_i r_{ij} \le R_j \ (0 \le i < N) \quad (2)$$

$$\text{and} \sum_j c_j \sum_i r_{ij} \le C. \quad (3)$$

The above optimization problem is equivalent to the Lagrange multiplier formulation written as $$\min\left\{\sum_i e_i \sum_j L_j r_{ij} + \sum_{j=0}^{N-1} \lambda_j\left(\sum_i r_{ij} - R_j\right) + \theta\left(\sum_j c_j \sum_i r_{ij} - C\right)\right\}. \quad (4)$$

3.2 Forwarding Mechanism to Support DiffServ Classes at Routers

To assign the prioritized video packets to several network DiffServ levels, the priority of each packet is classified and conditioned. With the priority associated with each video packet, routers can do re-mapping under constraints, such as, e.g., loss-rate differentiation, pricing, etc.

Random Early Detection (RED) queue management and Weighted Fair Queuing (WFQ) are known scheduling techniques that can be used to provide the differentiated forwarding in this exemplary proposed scheme.

RED provides congestion avoidance by taking advantage of TCP congestion control mechanisms. By randomly dropping packets prior to periods of high congestion, RED tells the packet source to decrease its transmission rate. Assuming the packet source is using TCP, it will decrease its transmission rate until all the packets reach their destination, indicating that the congestion is cleared. When RED is not configured, output buffers fill during periods of congestion. When the buffers are full, tail drop occurs, and all additional packets are dropped.

RED reduces the chances of tail drop by selectively dropping packets when the output interface begins to show signs of congestion. By dropping some packets early rather than waiting until the buffer is full, RED avoids dropping large numbers of packets at once and minimizes the chances of global synchronization. Thus, RED allows the transmission line to be used fully at all times.

WFQ scheduling is currently implemented in many advanced routers since it guarantees each queue to be allocated a fair share of bandwidth irrespective of the behavior of other queues in the same router. With this in mind, the following section considers an exemplary multiple queue configuration in which each queue is associated with at least one different network class. These queues may be served, for example, by a WFQ scheduler or the like.

3.3 Statistical Analysis for Packet Forwarding at the Routers

In this section a performance evaluation is provided of certain exemplary forwarding mechanisms in which RED and WFQ scheduling are combined. The statistical performance parameters such as packet loss and delay are derived as well as the relation among the parameters. Those skilled in the art will recognize that these parameters can be used in the implementation mechanisms such as dynamic buffer allocation at the router, routing path selection and call admission control.

Reference is now made to FIG. 8, which illustratively depicts a plurality of exemplary queues 308 configured to receive prioritized packets and coupled to a WFQ scheduler 802. Here, WFQ scheduler 802 sends out packets just before reaching the maximum delay variation for packets in the higher-priority queues. This decreases delay variation in the lower-priority queues.

The following analysis is based on WFQ and the analytical model shown in FIG. 8. In total there are N classes, and the overall service rate is $\mu$. Each class has four parameters: the arrival rate $\lambda_i$, the buffer length $B_i$, the weight $w_i$, and the threshold $H_i$. The statistical packet loss and delay is calculated using probability theory. However, in normal situations only the upper bound of the packet loss and delay is given.

To simplify the analysis, the following assumptions have been made:

1) the source is a Poisson stream;

2) the service time is a negative exponential distribution;

3) the process of the transition of the queue length is a birth-death process; and 4) RED is applied for packet dropping.

Notice that it is assumed that each class will be regulated (e.g., through a shaper mechanism) before it enters the core network so that the Poisson assumption is relatively reasonable.

Figure 9:
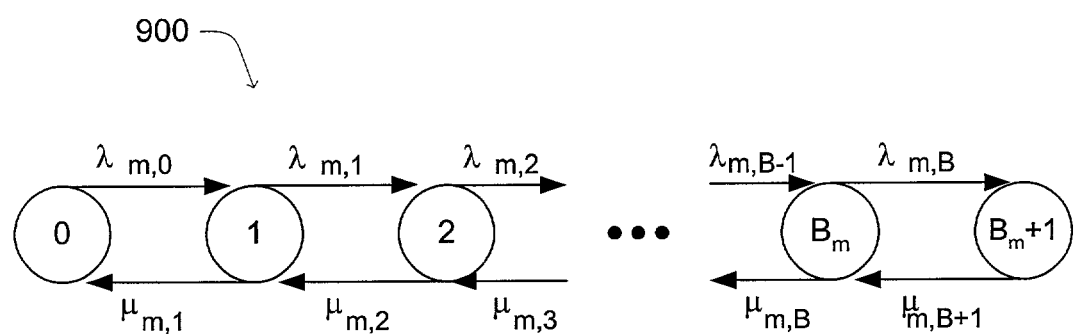
FIG. 9 is an illustrative representation of a transition diagram of a queue state, in accordance with certain exemplary implementations of the present invention.

Based on the above assumptions, the model of each class is an M/M/1 queue, whose arrival rate is $\lambda_m$ and service rate is $w_m\mu$. A resulting state transition diagram 900 is illustrated in FIG. 9.

The state i ($0 \le i \le B_m+1$) of class m has probability $\pi_{m,i}$. Using stochastic balance, we can get $$\pi_{m,k} = \pi_{m,0} \prod_{i=1}^{k} \frac{\lambda_{m,i-1}}{\mu_{m,i}} \quad (5)$$

where $$\pi_{m,0} = \left[1 + \sum_{k=1}^{B_m+1} \prod_{i=1}^{k} \frac{\lambda_{m,i-1}}{\mu_{m,i}}\right]^{-1} \quad (6)$$

Analysis is performed under the following potential cases:

1.) A non-work-conserve case is considered without using the RED schedule.

For class i, $\lambda_{m,i}=\lambda_m$ is a constant, and $\mu_{m,i}=w_m\mu$ is also a constant. Submitting $\lambda_{m,i}=\lambda_m$ and $\mu_{m,i}=w_m\mu$ into Equation (5) and (6), we obtain $$\pi_{m,k} = \pi_{m,0}\left(\frac{\lambda_m}{w_m \times \mu}\right)^k \quad (7)$$

where $$\pi_{m,0} = \left[1 + \sum_{k=1}^{B_m+1} \left(\frac{\lambda_m}{w_m \times \mu}\right)^k\right]^{-1} = \frac{1 - \left(\frac{\lambda_m}{w_m \times \mu}\right)}{1 - \left(\frac{\lambda_m}{w_m \times \mu}\right)^{B_m+2}} \quad (8)$$

For an M/M/1 model, the probability of the queue length that one observes at any time is equal to that which the one who just joins the queue observes. That is, P−=P. Hence, it can be seen that the packet loss probability is the probability that the queue buffer is full, which is given by $$P_{m,loss} = \pi_{m,B_m+1} = \left(\frac{\lambda_m}{w_m \times \mu}\right)^{B_m+1} \frac{1 - \left(\frac{\lambda_m}{w_m \times \mu}\right)}{1 - \left(\frac{\lambda_m}{w_m \times \mu}\right)^{B_m+2}} \quad (9)$$

Meanwhile, the delay probability is calculated as follows:

$$P_{m,delay} = \sum_{i=0}^{B_m} \pi_{m,i} \times e^{-\lambda i} \lambda \frac{(\lambda_i)^{m-1}}{(m-1)!} \quad (10)$$

2.) Now RED will be taken into account. Note that the arrival rate is not a constant any more in this case. When the length of queue m reaches $H_m$, the arriving packets will be dropped with a probability $D_m$, which is determined by the following RED equations:

$$D_{m,k} = \begin{cases} 0 & \text{when } 0 \le k < k_{min} \\ \frac{k - k_{min}}{k_{max} - k_{min}} D_{m,max} & \text{when } k_{min} \le k \le k_{max} \\ 1 & \text{when } k_{max} < k. \end{cases} \quad (11)$$

When the arrival rate decreases to $D_m\lambda_m$, then $\pi_{m,k}$ changes to:

$$\pi_{m,k} = \pi_{m,0} \prod_{i=1}^{k} \frac{\lambda_m x(1 - D_{m,k})}{w_m \times \mu} \quad (12)$$

From this equation, we can compute $\pi_{m,k}$ using $$\sum_{k=0}^{B_m+1} \pi_{m,k} = 1.$$

Thus, the loss probability is equal to $\pi_{m,B_m+1}$. Substituting Equation (12) into Equation (10), we get the updated delay probability.

3.) At last we consider the work-conserve case with RED. That is, when queue i is empty, the weight of the other queue is changed by the following equation:

$$w'_j = \frac{w_j}{\sum_{k \ne i} w_k} \quad (13)$$

In this case, the service rate is not simply $w_m \times \mu$. It is confined by the queue state. In such a situation, it is rather difficult to directly calculate the probability of the state. Here, an iterate equation can be given to solve this problem as follows:

$$w'_j = w_j \times \prod_{i \ne j} (1 - \pi_{i,0}) + \sum_{A \subset U} \left(\frac{w_j}{\sum_{k \in A} w_k + w_j} \prod_{i \in A} (1 - \pi_{i,0}) \prod_{i \in U-A} \pi_{i,0}\right) \quad (14)$$

where U={1, 2, . . . , j−1, j+1, . . . , N} and A represents all the subsets of U.

From Equation (14), one can derive the service rate $\mu_m = w_m \times \mu$ and then get $\pi_{m,k}$.

Although some preferred embodiments of the various methods and arrangements of the present invention have been illustrated in the accompanying Drawings and described in the foregoing Detailed Description, it will be understood that the invention is not limited to the exemplary embodiments disclosed, but is capable of numerous rearrangements, modifications and substitutions without departing from the spirit of the invention as set forth and defined by the following claims.

What is claimed is:

1. A method comprising:
  packetizing content information including video objects, to generate a media stream of a session wherein the media stream comprises a plurality of packets associated with a first video object and a plurality of packets associated with a second video object, and wherein:
    the first video object has a first quality of service (QoS) value;
    the second video object has a second QoS value; and
    the first QoS value is different than the second QoS value;
  wherein packetizing the content information comprises:
  using a marker mapping mechanism comprising an internet protocol (IP) stack to differentiate the packets associated with the first video object from the packets associated with the second video object within the media stream, wherein the IP stack comprises:
    a data path comprising:
      a transmission control protocol (TCP) layer;
      an IP layer; and
      a queuing layer, wherein the queuing layer comprises a plurality of priority class queues;
    a control path comprising:
      an application-aware QoS control layer;
      a packet classifier layer; and
      a QoS packet scheduler layer; and
    a scheduling layer;
    wherein the data path and the control path feed into the scheduling layer;
  generating resource coordination information based at least in part on:
    at least one prioritizing parameter associated with an application communicating the content information; and one or more prioritizing parameters associated with a particular video object that is selected by a user interaction via a remote device that is operatively coupled to a network;

such that the one or more prioritizing parameters reflect that the particular video object has a relatively higher priority than other ones of the video objects and is to be allocated a relatively higher portion of available bandwidth so that the particular video object can be provided to the remote device with relatively better perceptual visual quality;

based on the resource coordination information, selectively associating each packet of the media stream with a service class selected from among at least two different service classes;

selectively outputting at least one packet of the media stream based on a priority associated with the service class associated with the at least one packet such that the available bandwidth is allocated in accordance with the priority associated with the service class; and providing the at least one packet of the media stream to the network.

2. The method as recited in claim 1, wherein the user interaction comprises selection of the particular video object by at least one of mouse clicking, mouse moving, object zoom-in, or object zoom-out.

3. The method as recited in claim 1, wherein generating the resource coordination information further includes generating the resource coordination information based at least in part on at least one prioritizing parameter associated with a monitored performance of the network.

4. The method as recited in claim 1, further comprising encoding initial content information as the content information.

5. The method as recited in claim 4, further comprising segmenting raw video data into a plurality of video objects and wherein at least one of the video objects is included in the initial content information.

6. The method as recited in claim 4, wherein the initial content information includes data representing media information selected from a group comprising video information, audio information, image information, and textual information.

7. One or more computer-readable storage media comprising computer instructions for performing acts comprising:

packetizing content information including video objects, to generate a media stream of a session wherein the media stream comprises a plurality of packets associated with a first video object and a plurality of packets associated with a second video object, and wherein:
the first video object has a first quality of service (QoS) value;
the second video object has a second QoS value; and
the first QoS value is different than the second QoS value;

wherein packetizing the content information comprises:
using a marker mapping mechanism comprising an internet protocol (IP) stack to differentiate the packets associated with the first video object from the packets associated with the second video object within the media stream, wherein the IP stack comprises:
a data path comprising:
a transmission control protocol (TCP) layer;
an IP layer; and
a queuing layer, wherein the queuing layer comprises a plurality of priority class queues;
a control path comprising:
an application-aware QoS control layer;
a packet classifier layer; and
a QoS packet scheduler layer; and
a scheduling layer;
wherein the data path and the control path feed into the scheduling layer;

generating resource coordination information based at least in part on:
at least one prioritizing parameter associated with an application communicating the content information; and
one or more prioritizing parameters associated with a particular video object that is selected by a user interaction via a remote device that is operatively coupled to a network;
such that the one or more prioritizing parameters reflect that the particular video object has a relatively higher priority than other ones of the video objects and is to be allocated a relatively higher portion of available bandwidth so that the particular video object can be provided to the remote device with relatively better perceptual visual quality;

based on the resource coordination information, selectively associating each packet of the media stream with a service class selected from among at least two different service classes;

selectively outputting at least one packet of the media stream based on a priority associated with the service class associated with the at least one packet such that the available bandwidth is allocated in accordance with the priority associated with the service class; and providing the at least one packet of the media stream to the network.

* * * * *